3,091,029
BRAZING ALLOY APPLICATION METHOD

Charles L. Davis, Thousand Oaks, and James R. Blanchard and Chester S. Shira, Canoga Park, Calif., assignors to North American Aviation, Inc.
No Drawing. Filed July 13, 1960, Ser. No. 42,503
4 Claims. (Cl. 29—496)

This invention relates to a method of applying an alloy in particle form to a metal-containing surface of a workpiece. More particularly, this invention relates to a method of applying a uniform coat of a brazing alloy to a metal surface.

Methods of applying alloy particle compositions to the surfaces of a metal workpiece for the purpose of tinning or pre-placing of a brazing alloy are numerous in the art. One method is to prepare a solution of brazing alloy and flux in a liquid vehicle and apply it to a surface with the aid of a brush or spatula. Another method consists of preparing a thick paste or jelly-like emulsion having the consistency of mayonnaise and applying this to a metal surface with a roller or spray jet. In the prior art method of application, the particles of brazing alloy remain suspended in the flux and consequently a portion of the alloy remains on the surface of the flux. Upon the application of heat, these surface particles readily oxidize because they are not properly protected by the flux. The oxidized particles do not adhere to the surface being brazed, tinned, or soldered. There is, therefore, loss of material.

The prior art methods have the disadvantage that, upon heating of the layer of brazing alloy or solder and flux, the particles of alloy are drawn together into smaller areas due to the surface tension of the evaporating liquid. The resulting brazed or soldered surface is very uneven. Excess material must be applied in order to insure that all parts of the surface are covered upon fusion and flowing of the alloy particles. When the coating is uneven, it is often necessary to put the brazed, tinned, or soldered parts through a rolling operation in order to reduce them to a proper overall size. This is both costly and time-consuming.

It is, therefore, an object of this invention to provide a method for applying solder and brazing alloy particles to the metal-containing surface of a workpiece in a manner which will insure a uniform coating of the alloy particles. It is also an object of this invention to provide a method for coating metal surfaces of articles with a uniform coating of solder or brazing alloy. Another object of this invention is to provide a method for pre-placing a uniform coating of brazing alloy on the surface, or surfaces, of metals to be brazed. Still another object of this invention is to provide a method for applying a minimum thickness of solder or brazing alloy uniformly over a metal-containing surface. It is likewise an object of this invention to provide a method for brazing. Still other objects will be apparent from the discussion that follows.

The above and other objects of this invention are accomplished by a method of applying an alloy in particle form to a metal-containing surface of a workpiece comprising spraying a dispersion of the alloy onto the surface. The dispersion comprises a combination of components of one part by weight of the alloy particles, from 0 to about 20 parts of flux and/or resin, and from 1 to about 20 parts of a liquid carrier vehicle. The dispersion is applied with a force sufficient to cause at least a portion of the alloy particles to contact the surface. The alloy that is applied to the surface is either a brazing alloy or a soldering alloy.

The method of this invention lends itself to the application of any of the soldering and brazing alloys commonly used in the art. Non-limiting examples of such alloys will be found in the "Welding Handbook" (1931), third edition, published by American Welding Society, New York. Silver alloys, for example, are easily applied by the process of this invention. These silver alloys include binary silver-copper alloys, ternary silver-copper-phosphorous alloys, silver-copper-zinc alloys, as well as silver alloys containing nickel, cadmium, and tin. A non-limiting specific example of the silver alloy is one containing 9 weight percent silver, 58 weight percent copper, and 37 weight percent zinc. Still other silver alloys will be found in the table on page 866 of the "Welding Handbook," supra. The process is also applicable to brazing with copper and copper alloys such as, for example, copper alloys containing from 40 to 50 weight percent zinc. Aluminum and aluminum alloy brazing may also be carried out by the process of this invention. A non-limiting example of an aluminum alloy is one containing 4 weight percent copper, 1 percent zinc, and the balance aluminum. An example of soft solder is an alloy of 95 to 80 weight percent lead and 5 to 20 weight percent tin. Other soldering alloys will be found in the table on page 82 of the "Metals Handbook," infra. Still other soldering and brazing alloys will be apparent to those skilled in the art.

A flux is normally employed with brazing and soldering alloys except in the case where the alloy is self-influxing, as is the case with copper-phosphorous alloys in application to ferrous metals. The brazing fluxes are employed to dissolve oxides of metal on the surface of the metal being brazed. Borax is a common flux, as well as a mixture of borax and boric acid. The fluxes employed on stainless steel must be able to dissolve chromic oxide. Therefore, such fluxes contain potassium, sodium, or zinc chloride, or potassium fluoride. Still other fluxes contain borates and fluoborates. A flux employed in forge-welding consists of clean silica sand and borax. A flux employed with Inconel or K Monel, for example, consists of 2 parts of boron free flux or one part of potassium fluoride, together with one part shellac, 5 parts of alcohol and water added to give the desired consistency. An example of a flux for magnesium welding is one containing 54 weight percent potassium chloride, 30 weight percent calcium chloride, 12 weight percent sodium chloride, and 4 weight percent lithium chloride. A silicon-bronze welding flux, for example, contains 90 percent fused borax and 10 percent sodium fluoride, and is mixed with methyl alcohol for application. Fluxes for soft soldering may contain citric acid in a water solution or dissolved in alcohol with added glycerine or sulfonated alcohol to aid the wetting action. Various fluxes are well known in the art. It is not intended to limit the processes of this invention to any particular type of metal surface, brazing, or soldering alloy applied to the surface, or the flux or diluent employed. Therefore, the discussion with respect to alloys, fluxes, etc., is for illustration purposes only. The various fluxes which can be used will be apparent to those skilled in the art.

Many diluents are employed with the fluxes and these diluents are also employed in preparing soldering and brazing alloy dispersions for application by the method of this invention. The amount of diluent employed is that which will make the dispersion of a sprayable consistency. This can vary from 1 to about 20 parts diluent per part of brazing or soldering alloy. The viscosity of diluent should be such that upon spraying of the dispersed soldering of brazing alloy composition onto a workpiece with a force of from about 5 to about 100 pounds' pressure, the suspended or dispersed alloy particles will travel through the dispersion medium to contact the surface. Substantially all of the alloy particles will then be in direct contact with the surface or with other particles that are in contact with the surface. In that way, practically no alloy particles are left suspended in or resting on the surface of the dispersion medium. Hence, upon heating, the diluent is removed with substantially no displacement of the alloy particles and the alloy particles melt and flow to form a uniform film on the surface of the metal article. It is found that the viscosity of the dispersion medium for this purpose can vary from about 0.28 centipoise, as represented by acetone at a temperature of substantially 41° C. to about 3 centipoises, as represented by n-butyl alcohol at 20° C. The diluents employed consist of water and/or organic compounds and various mixtures thereof. The organic compounds include hydrocarbons, halogenated hydrocarbons, alcohols, aldehydes, acids, esters, ketones, ethers, etc. All such compounds can be used because they are non-corrosive towards metals and metal surfaces, especially under brazing, welding, or soldering conidtions. The hydrocarbons employed can be aliphatic, cycloaliphatic, aromatic, alkyl-substituted aromatic, etc. Non-limiting examples of suitable diluents include such hydrocarbons as heptane, dodecane, cyclohexane, benzene, ethylbenzene, toluene, o-xylene; halogenated hydrocarbons such as ethylbromide, butylbromide, chlorobenzene, fluorobenzene; alcohols such as methyl alcohol, ethyl alcohol, propyl alcohol, octanol; aldehydes such as propaldehyde; carboxylic acids such as acetic acid and butyric acid; carboxylic acid esters such as ethyl acetate, butyl acetate, ethyl butyrate; ketones such as acetone, methyl ethyl ketone, dibutyl ketone; ethers such as dibutyl ether, diethyl ether, methyl butyl ether, etc. Other diluents with higher viscosities are also used in combination with vehicles of lower viscosity to provide mixtures having a suitable viscosity. Mixtures of various diluents are also employed. Many other suitable diluents will be found in the "Handbook of Chemistry and Physics," pages 2182–2188, 41st edition, published by the Chemical Rubber Publishing Company, Cleveland, Ohio. It is, however, not intended to provide novel diluents for the fluxes and alloy dispersions employed in the process of this invention, but merely to indicate that any non-corrosive diluent having the proper viscosity serves the purpose well.

The viscosity of the brazing alloy dispersion varies from about 0.28 centipoise to about 3,000 centipoises. An example of the lower viscosity composition is one containing one part of silver brazing alloy, 1 part of flux as described in Example I, infra, together with an amount of acetone sufficient to provide the stated viscosity. An example of a dispersion having the higher viscosity is one containing 1 part of silver brazing alloy and about 20 parts of flux of the type described in Example I, infra, together with an amount of water sufficient to provide the stated viscosity of about 3,000 centipoises. In order to minimize the danger of the applied coating draining off the surface, it is preferable to provide dispersions of viscosities of from about 1800 to about 3,000 centipoises. The use of brazing and soldering alloy dispersions having viscosities within this range constitutes a preferred embodiment of this invention.

Fluxes containing fluorides may produce fumes which are irritating to the respiratory tract. For operation in confined spaces, local exhaust ventilation for the removal of the fumes is essential.

The process of this invention is used in applying brazing or soldering alloy to any metal-containing surface. It embodies, for example, the application of brazing alloys to a surface of stainless steel. Non-limiting examples of steels include AISI type, No. 301, 403, 430, and 502 stainless steels. The process of this invention is applicable to the tinning or brazing of iron, iron-carbon alloys such as 4130 steel, silver and silver alloys, copper and copper alloys, nickel, Inconel, magnesium and magnesium alloys, cast alloys, aluminum and aluminum alloys, etc. The various metals and alloys are found in the "Metals Handbook" (1958), published by the American Society for Metals, Cleveland, Ohio. The naming of the various metal and metal alloy surfaces and articles that can be brazed or tinned by the process of this invention is for the purpose of illustration and not for the purpose of restriction. Any metal or metal alloy-containing surface may be tinned or brazed by the process of this invention.

The alloy particles employed in the process of this invention are of a particle size which will pass through a 40 mesh screen to particles small enough to pass through a 200 mesh screen. Particles larger than those which will pass through a 40 mesh screen are usually not employed because of the possibility of getting an uneven coating of the brazing alloy. For better spray coverage, it is preferred to employ particles of a size which pass through a screen of a mesh within the range of from about 120 to about 40. Such particles have sufficient mass and inertia upon spraying so that they are propelled through the flux and diluent or carrier vehicle to contact the surface to be brazed, or to contact other particles that are in contact with the surface. When using smaller particles of brazing alloy, especially those of a size which will pass through, say, a 300 mesh screen, there is danger of the alloy particles lacking sufficient mass and inertia to penetrate the flux and diluent vehicle upon spraying. Such small particles do not reach the surface to be brazed and tend to float and form agglomerates upon heating. This results in an uneven thickness of the brazing or tinning film.

The metal-containing surface of the article to which a soldering or brazing alloy in particle form is to be applied is first cleaned of scale, dirt, and other foreign material, using chemical or mechanical methods. For example, grease, oils, etc., can be removed by washing or scrubbing with such compounds as trichloroethylene, acetone, methylisobutyl ketone, etc. The surface is then roughened by well known methods in the art, such as grit-belt sanding, or grit-blasting, in order to improve wettability by the molten alloy upon heating. The dispersion of alloy particles is then applied with suitable spray equipment. A non-limiting example of a spray gun is a standard heavy-duty paint spray gun having a No. 7 spray nozzle.

The pressure employed is of a magnitude such that when the dispersion composition is applied to the surface, the alloy particles are propelled toward the metal-containing surface, making contact therewith or with other metal particles which are already in contact with the metal-containing surface.

The dispersion is applied in an amount such that, upon heating and melting of the alloy particles, a film of from about 0.1 thousandths of an inch (0.1 mil), to about 15 mils of the applied alloy will be formed on the metal-containing surface. A thicker film can be applied if desired, however, it is found that if increased above about 15 mils, the film will run about the edges. This makes it more difficult to maintain a uniform thickness. It is preferred to apply the brazing or soldering alloy in amounts sufficient to form a film upon heating of 10 mils or less as, then, the danger of draining or running of the dispersion is minimized.

After spraying the dispersion onto the metal surface to give the desired thickness, the dispersion is heated by any method, such as gas torch, induction heating, radiation, passing through a furnace or placing in an oven, until the alloy particles melt and flow. Heating is then discontinued. During the heating, the diluent or carrier vehicle is evaporated or slowly burned off. However, because the particles in the applied film have all been propelled to make contact with the metal surface or with other particles in contact with the metal surface, they remain anchored at the surface and do not form agglomerates in smaller areas. Hence, no part of the surface is left bare or with a thinner coat of the metal particles. After the alloy particles have melted, the metal-containing surface with the brazing or soldering alloy film thereon, is cooled. Any flux remaining on the surface comes off by itself during the operation. However, if necessary, the surface may be rinsed with hot water or scrubbed with a bristle brush or other convenient means to remove excess flux. In some instances, such as in the brazing of Inconel X and hastelloy, it may be necessary to perform the heating operation in an inert or reducing atmosphere to prevent oxidation of unfluxed areas of the workpiece. Atmospheres used for this purpose include hydrogen, helium, argon, nitrogen, etc. In most instances, however, no inert atmosphere is required. On inspection of the cooled surface, it is found that the brazing alloy or soldering alloy film is of uniform thickness and no further machining is required. A good metallurgical bond between the alloy and the brazed or soldered material is formed. Hence, upon rolling, no separation takes place. Consequently, a metal or alloy which has been coated with a brazing alloy by the process of this invention can be rolled, or stretch-formed, or bent through a sharp radius without separation of the alloy film from the metal surface.

The following examples will more clearly illustrate the process of this invention.

*Example I*

A 4130 steel band, 2" wide and 0.063" thick, was sprayed with a silver alloy tinning composition. The silver brazing alloy was composed of 45 weight percent silver, 24 weight percent cadmium, 16 weight percent zinc, and 15 weight percent copper. The flux employed consisted of a mixture of potassium acid fluoride, boric acid, potassium tetraborate, and potassium borate, such that the relative proportions of potassium, boron, fluorine, and sodium were 2.6:1:1.8:0.1, respectively. The brazing alloy was of a particle size which passed through a 100 mesh screen. One part of brazing alloy and 4 parts of flux were dispersed in an amount of water sufficient to provide a dispersion having a viscosity of substanstially 2,490 centipoises. The brazing alloy and flux dispersion were sprayed onto the entire surface of the steel band in an amount sufficient to form a brazing alloy thickness, upon heating, of substanstially 10 mils. After the spraying, the band was uniformly moved and heated by a mechanically fixed, oxy-acetylene heating torch to a temperature of substantially 1200° F. for a length of time sufficient to allow the silver brazing alloy to melt and flow. The band was then allowed to cool to ambient temperature of about 73° F. Small amounts of flux that had not spalled during the cooling were removed by scrubbing with hot water and a soft bristle brush.

The silver-tinned steel band was bent through a radius equivalent to twice the thickness of the band. There was no separation of the brazed film from the steel band. Sectioning of the band showed the brazing film to be of uniform thickness over the entire surface. No bubbles formed between the film and the brazing metal.

The silver-tinned bands were formed into permanent hoops for reinforcing rocket engine thrust chambers constructed of regenerative cooling tubes. After the tubes of the thrust chamber were brazed together, a silver-tinned band was clamped in the required location and maintained under pressure while heat was applied with a torch to cause the brazing alloy on the surface of the band juxtaposed to the tubes to melt and flow. In this manner, a brazed joint was made between the band and the tubes of the thrust chamber. Where fit-up was not proper, additional brazing alloy was added so that the hoop or band was brazed to the tubes along its entire length.

*Example II*

A dispersion is made of an AZ92 magnesium brazing alloy of a particle size which will pass through a 40 mesh screen, together with one part of a flux consisting of 54 weight percent potassium chloride, 30 weight percent calcium chloride, 12 weight percent sodium chloride, and 4 weight percent lithium chloride in an amount of ethyl alcohol sufficient to provide a composition having a viscosity of substantially 1,800 centipoises. The dispersion is sprayed onto an M1 magnesium alloy workpiece with a pressure sufficient to propel the brazing alloy particles to contact the surface. The workpiece is then heated with a gas torch until the brazing alloy melts and flows. It is then cooled. Sectioning of the magnesium workpiece shows the thickness of the brazing alloy to be uniform and substantially 0.5 mil thick.

*Example III*

One part of a brazing alloy composed of aluminum and 10 weight percent silicon, together with 1 part flux containing 46 weight percent potassium chloride, 26 weight percent sodium chloride, 4 weight percent sodium fluoride, and 24 weight percent lithium chloride, and 20 parts of water are sprayed with a pressure of substantially 100 pounds onto the surface of an aluminum alloy workpiece containing 4 percent copper in an amount sufficient to provide a film of brazing alloy substantially 0.1 mil thick upon heating. The coated workpiece is heated in an oven until the alloy particles melt and flow. The workpiece is then cooled to ambient temperature. Upon sectioning, it is found that the brazing alloy is of a uniform thickness of substantially 0.1 mil over the coated surface of the article.

*Example IV*

The process of Example III is repeated with the modification that acetone is used as the diluent in an amount sufficient to provide a dispersion having a viscosity of substantially 0.28 centipoise at 41° C. The dispersion is sprayed onto the surface with a force of substantially 5 pounds. A good brazed film is obtained.

*Example V*

A brazing alloy dispersion is made up of 1 part of a soldering alloy containing substantially 80 percent lead and 20 percent tin of a particle size which will pass through a 120 mesh screen, together with 2 parts of a saturated solution of citric acid in ethyl alcohol as a flux and 10 parts of additional ethyl alcohol as a carrier vehicle. The dispersion is sprayed on the surface of a copper workpiece. The thickness of the dispersion film on the surface is sufficient to provide an alloy film upon heating of substantially 15 mils thick. The specimen is then placed in an electric oven and the heat slowly raised until the lead-tin alloy particles melt and flow. The specimen is then removed from the oven and allowed to cool. Upon sectioning of the article, it is found that the film is uniform over the surface to which it is applied and of a thickness of substantially 15 mils. There is no flaking off of the solder.

*Example VI*

The procedure of Example V is repeated with the modification that a stream of lead-tin alloy particles is entrained in a stream of flux and carrier liquid after atomization of the liquid and before impinging upon the surface of the copper workpiece. A satisfactory film coating of solder is obtained.

*Example VII*

Following the procedure of Example I, an Inconel workpiece is brazed to form a film of alloy on the surface. The brazing alloy contains 91.2 parts nickel, 1.4 parts iron, 2.9 parts boron, and 4.5 parts silicon. The brazing alloy is of a particle size which will pass through a 120 mesh screen. A dispersion is made up of 25 parts alloy, 75 parts n-propylmethacrylate resin, together with an amount of toluene sufficient to provide a dispersion having a viscosity of substantially 3,000 centipoises. The brazing alloy dispersion is sprayed with a force sufficient to propel the alloy particles to the Inconel surface. The amount applied is sufficient to provide a finished brazed coating of substantially 5 mils thickness. The coated workpiece is then heated in a hydrogen atmosphere to a temperature sufficient to cause the brazing alloy to melt and flow. The binder resin burns off during the heating. The workpiece is then cooled. An even coating of alloy is found on the brazed workpiece.

*Example VIII*

The procedure of Example VII is repeated, with the modification that sodium fluoborate is employed as a fluxing agent. The dispersion contains 25 parts of brazing alloy, 55 parts of sodium fluoborate and 20 parts methylmethacrylate resin. A good even coating of brazed alloy is obtained on the surface of the Inconel workpiece.

Other binder resins are also used in place of the acrylic resins employed in the illustrative examples above. The amount of the binder employed, as in the case of flux, varies from about 1 to about 20 parts per part of alloy particles.

*Example IX*

A brazing alloy dispersion is prepared containing 1 part of the brazing alloy of Example I, 10 parts of the flux of Example I, and an amount of monochlorobenzene sufficient to provide a composition having a viscosity of substantially 3,000 centipoises at 20° C. This dispersion is sprayed onto the surface of a 4130 stainless steel workpiece with a force of 100 pounds' pressure so as to propel the brazing alloy particles through the flux and water vehicle to the surface of the workpiece in an amount sufficient to make a brazing alloy film coating of substantially 10 mils thick upon heating. The workpiece and film of brazing alloy dispersion is then heated in an electric furnace until the brazing alloy melts. At this point, another workpiece of 4130 stainless steel is brought into contact with the molten film. The furnace and contents are then cooled to an ambient temperature of substantially 25° C. to form a brazed joint between the two workpieces of stainless steel.

The process described in Example IX illustrates the pre-placing of a brazing alloy on the surface of a workpiece in the making of a brazed joint between two pieces of metal.

In order to prevent the settling of the brazing alloy or soldering powder in some applications, it may be necessary to place several ball-bearings in the spray gun container in order to facilitate mixing. Mixing can be accomplished by the use of ultra-sonic vibrations, magnetic vibrator, paddle-stirrer, or by intermittently forcing air through the mixture. These methods are used continuously or to stir the mixture prior to the resumption of spraying in intermittent operation of the spray gun.

Although the invention has been described in some detail, it is to be clearly understood that the same is by way of illustration and example only and its not to be taken by way of limitation, the spirit and scope of this invention being limited only by the terms of the appended claims.

We claim:

1. A method of brazing two articles together, each having a metal-containing surface area, the method comprising the steps of spraying a brazing composition upon said surface area of one of said articles to form a deposit of a thickness from about 0.1 mil to about 15 mils, said composition consisting essentially of one part brazing alloy particles of a size range which will pas sthrough from about a 40 to about a 200 mesh screen, from 0 to about 20 parts flux, and from 1 to about 20 parts of a liquid carrier vehicle having a viscosity of substantially not in excess of about 3 centipoises, said composition having a viscosity not in excess of about 3,000 centipoises and said particles being settleable in said composition, said spraying step being effected with a force sufficient to cause at least a portion of said alloy particles to contact said one article; heating said deposit to a temperature sufficient to melt said particles, thereby forming a film of brazing alloy; and contacting the other of said articles with said film to braze said articles together.

2. The method of claim 1 wherein said brazing alloy is a silver base brazing alloy.

3. The method claim 1, wherein said brazing alloy is composed of substantially 45 parts by weight silver, 24 parts by weight cadmium, 16 parts by weight zinc, and 15 parts by weight copper.

4. The method of claim 1, wherein said vehicle is water.

References Cited in the file of this patent

UNITED STATES PATENTS

| | | |
|---|---|---|
| 2,826,309 | Forman et al. | Mar. 11, 1958 |
| 2,857,292 | Moore | Oct. 21, 1958 |
| 2,908,072 | Johnson | Oct. 13, 1959 |
| 2,955,958 | Brown | Oct. 11, 1960 |